3,454,654
STABILIZED 2,4-DIBROMOPHENOL
AND ITS PRODUCTION
William E. Hobbs, Louisville, Ky., assignor to Great Lakes Chemical Corporation, West Lafayette, Ind., a corporation of Michigan
No Drawing. Filed May 2, 1967, Ser. No. 635,377
Int. Cl. C07c 39/24
U.S. Cl. 260—623                                     7 Claims

ABSTRACT OF THE DISCLOSURE

Dibromination of 2,4-dibromophenol at about room temperature in non-ionic solvent in the presence of 2,6-di-tert.-butyl-4-cresol to inhibit color formation and 2,4-dibromophenol stabilized therewith.

This invention relates to stabilized 2,4-dibromophenol and a process for its production.

2,4-dibromophenol is known to develop color on storage. Lead phosphate salts have been used as stabilizers to prevent color formation. See U.S. 2,716,139. It is an object of this invention to provide 2,4-dibromophenol stabilized against such colorization with a non-metallic stabilizer.

The dibromination of phenol in non-ionic solvents at about room temperature results in the production of colored 2,4-dibromophenol. It is an object of this invention to provide such a process in which such color formation is inhibited. Other objects will be apparent to those skilled in the art to which this invention pertains.

The invention sought to be patented, in its composition aspect, resides in the concept of substantially pure 2,4-dibromophenol, stabilized by the presence therein of 2,6-di-tert.-butyl-4-cresol. In its process aspect it resides in the concept of inhibiting the formation of colored by-products in the dibromination of phenol with elemental bromine in a non-ionic solvent, by conducting the bromination in the presence of 2,6-di-tert.-butyl-4-cresol. The thus-produced 2,4-dibromophenol is stabilized by the presence of the 2,6-di-tert.-butyl-4-cresol.

The bromination of phenol is a well known reaction. Dibromination in an ionic solvent proceeds rapidly and often produces a water-white product. However, the reaction is not selective in this solvent so it is not possible to obtain very pure 2,4-dibromophenol, substantially free from monobrominated and tribrominated impurities.

Carbon tetrachloride is a convenient non-ionic medium for the bromination. Starting material and product are both soluble. The solvent is readily removed leaving a dry product. Contrary to the ionic solvents, it permits highly selective dibromination. However, a major problem encountered with carbon tetrachloride is formation of a colored product. The intensity of the color in the crude product increases with increasing reaction temperatures. Although bromination at 0° in carbon tetrachloride produces a white or off-white product, usually but not consistently, color develops on standing in clear containers. Moreover, commercially it is preferable not to conduct brominations at 0° C.

It has now been found that 2,6-di-tert.-butyl-4-cresol (available commercially under the tradmark "Ionol") inhibits the color formation normally associated with dibromination of phenol in carbon tetrachloride at about room temperature. Thus far, no other related compound has been found which achieves the same result.

Because 2,6-di-tert.-butyl-4-cresol is an anti-oxidant, a variety of other anti-oxidants were tried, in concentrations of 1–2 percent w./w. on the phenol, in an attempt to inhibit color formation in brominations conducted at 30–40°. Colors were still produced, even in the presence of these antioxidants.

Even 2,6-di-tert.-butyl-4-cresol gives colored products at temperatures above 30°. (The product obtained with 0.1 percent w./w. of 2,6-di-tert.-butyl-4-cresol in a dark reaction at 30–40° under nitrogen was pink.) However, when the temperature of the bromination was up to 30° C., a white product is obtained. Thus, temperature is the controlling factor, even in the presence of this stabilizer. However, in the presence of the stabilizer, colorless brominations at room temperature can be achieved. Moreover, the stabilizer also substantially increases the stability of dibromophenol in storage.

Dibrominating phenol in carbon tetrachloride at about room temperature in the presence of 0.1 percent w./w. of the stabilizer, calculated on the phenol is suitable for large scale commercial production. A stable white product is directly obtained by removing the solvent from the reaction mixture in vacuum.

It will be apparent other non-ionic halogenated hydrocarbon solvents which are resistant to bromination can be used, e.g., chloroform, methylene dichloride, ethylene dichloride, etc.

The reaction is preferably conducted at 15° to 30° C., preferably about room temperature, e.g., 20–28° C.

The amount of stabilizer employed can vary widely. The upper limit is determined by its economic feasibility. Usually less than 5 percent, calculated on the weight of the phenol, is employed. The lower limit is determined by reaction temperature employed and the degree of storage stability desired. Generally, at least 0.01 percent is employed. The preferred range is 0.05 to 2 percent. 0.1 percent gives a storage stable white product upon bromination at 25° C. 0.05 to 0.5 is the most preferred range.

The composition of this invention preferably consists of essentially colorless, e.g., having an APHA color value less than 100, 2,4-dibromophenol of at least 96 percent purity and containing a total of less than 4 percent of other brominated phenols. Other blocked phenolic compounds, such as those in which a different lower-alkyl is present at the 2,4- and/or 6-position, e.g., methyl, ethyl, isopropyl, tert.-butyl, such as for example, 2,4,6-tri-tert.-butylphenol, can also be used as the stabilizer in the stabilized 2,4-dibromophenol of this invention. 2,6-di-tert.-butyl-4-cresol can also be used to stabilize other brominated phenols, e.g., p-bromophenol, 4-bromo-o-cresol, 4-bromo-n-cresol, 4-bromo-2-t-butylphenol, 4-bromo-2-ethylphenol, 4-bromo-2-isopropylphenol, 4-bromo-2-hexylphenol and 4-bromo-2-phenylphenol, i.e., p-bromo-phenols wherein the o-substituent is hydrogen, phenyl or alkyl.

The following examples are illustrative of this invention.

EXAMPLES.—General procedure

A 500 ml. three-neck round-bottom flask, provided with a stirrer, thermometer, dropping funnel, and condenser connected to a water trap was charged with 70 g. (0.745 mole) phenol U.S.P., 95 ml. carbon tetrachloride and 0.7 g. or 0.07 g. 2,6-di-tert.-butyl-4-cresol. While maintaining the appropriate temperature, 239 g. (1.49 moles) bromine was added to the clear white reaction solution over a period of one hour.

Stirring was then continued at ambient temperature for 2 to 3 hours. The solvent was removed in vacuum on a water bath at 30–40°. The residual oil crystallized in all cases. The colors of the crude products are shown in Table I. Yields were all above 97 percent of theory.

TABLE I.—BROMINATION IN CCl₄ IN PRESENCE OF 0.1 PERCENT 2,6-DI-TERT.-BUTYL-4-CRESOL

| Ex. No. | Temp. of bromination (deg.) | Product color | VPC-assay | | | |
|---|---|---|---|---|---|---|
| | | | 2,4-diBr | 2,4,6-triBr | p-Br | o-Br |
| 1 | 10-15 | White | 98 | tr | tr | tr |
| 2 | 20-25 | do | 97 | 1 | 2 | tr |
| 3 | 30-35 | Gray | 98 | 1 | 1 | 1 |
| 4 | 30-40 | Pink | 97 | 1 | 2 | 1 |
| 5 | 30-40 | Tan | 98 | 1 | 1 | 1 |
| 6[1] | [1] 30-40 | do | 97 | tr | tr | tr |
| 7 | 40-45 | Red | 97 | 2 | tr | tr |
| 8 | Reflux | Purple | 97 | 1 | 1 | 1 |

[1] 1.0 percent 2,6-di-tert-butylcresol used.

COMPARATIVE EXAMPLES

The following tables illustrate the results obtained in carbon tetrachloride without stabilizer, with other stabilizers and in other solvents.

TABLE II.—BROMINATION IN CARBON TETRACHLORIDE WITHOUT STABILIZER

| Ex. No. | Temp. (deg.) | Product Color | Yield | VPC-assay | | | |
|---|---|---|---|---|---|---|---|
| | | | | 2,4-diBr | 2,4,6-triBr | p-Br | o-Br |
| a | 0 | White-amber | 99.2 | 98 | tr | 1 | |
| b | 0 | Lt. tan | 98 | 99 | 1 | tr | tr |
| c | 0 | White | 97.5 | 96 | 4 | tr | tr |
| d | 30 | Lt. tan | 97.7 | 99 | 1 | .2 | .1 |
| e | 30 | Lt. tan | 98 | 94 | .6 | 5.4 | |
| f | 30 | Red | 98.8 | 95 | .7 | 4 | .4 |
| g | 30 | Red | 96 | 98 | 1 | 1 | tr |

TABLE III.—DIBROMINATION IN CARBON TETRACHLORIDE AT 30-40° IN THE PRESENCE OF OTHER ANTIOXIDANTS

| Ex. No. | Antioxidant | Wt. percent on phenol | Product color | VPC-assay | | | |
|---|---|---|---|---|---|---|---|
| | | | | 2,4-diBr | 2,4,6-triBr | p-Br | o-Br |
| h | 2,6-t-butyl phenol | 2 | Purple | 97 | 2 | 1 | 1 |
| i | "Irganox 565" | 1 | Brown | 98 | 1 | 1 | 1 |
| j | "Irganox 1010" | 1 | Red | 99 | tr | tr | tr |
| k | "Santovar A" | 1 | Red | 99 | tr | tr | tr |

TABLE IV.—DIBROMINATION AT 30-40° IN ALCOHOLS AND ALCOHOL MIXTURES

| Ex. No. | Alcohol | Other solvent percent | Product color | VPC-assay | | | |
|---|---|---|---|---|---|---|---|
| | | | | 2,4-diBr | 2,4,6-triBr | p-Br | o-Br |
| l | MeOH | | Tan | 96 | 2 | 2 | tr |
| m | MeOH | | Tan | 92 | 3 | 5 | tr |
| n | MeOH | | Pink | 89 | 6 | 5 | .1 |
| o | MeOH | H₂O (trace) | White | 82 | 18 | tr | tr |
| p | MeOH | CCl₄ (50%) | Tan | 98 | 2 | 2 | tr |
| q | MeOH | CCl₄ (50%) | Orange | 97 | 1 | 2 | tr |
| r | EtOH | H₂O (5%) | Tan | 96 | 2 | 2 | tr |
| s | i-PrOH | | Red | 96 | 1 | 2 | 1 |
| t | n-BuOH | | Tan | 98 | 2 | tr | tr |

What is claimed is:

1. Colorless 2,4-dibromophenol of at least 96 percent purity containing a total of less than 4 percent of other bromophenols and having an APHA color value below 100, stabilized against color formation on storage by the presence therein of a minor proportion of 2,6-di-tert.-butyl-4-cresol.

2. A composition according to claim 1 containing less that 2.0 percent 2,6-di-tert.-butyl-4-cresol.

3. A composition according to claim 1 consisting of 2,4-dibromophenol of at least 97 percent purity, containing between 0.05 and 0.5 percent 2,6-di-tert.-butyl-4-cresol.

4. A method for inhibiting the formation of colored by-products in the dibromination with elemental bromine of phenol in a non-ionic solvent resistant to bromination which comprises conducting the bromination in the presence of an effective amount between about 0.01 and 5 percent of 2,6-di-tert.-butyl-4-cresol at a temperature of up to 30° C.

5. The method of claim 4 wherein the bromination is conducted at about room temperature.

6. The method of claim 4 wherein the bromination is conducted in carbon tetrachloride.

7. The method of claim 4 wherein the bromination is conducted in the presence of between 0.05 and 0.5 percent, calculated on the phenol, of 2,6-di-tert.-butyl-4-cresol.

References Cited

UNITED STATES PATENTS

| 2,800,451 | 7/1957 | Mothern. | |
| 2,656,311 | 10/1953 | Stevens et al. | |
| 2,603,662 | 7/1952 | Stevens | 260—623 |
| 2,877,273 | 4/1959 | Enos | 260—624 |

OTHER REFERENCES

Kaeding, Jour. Org. Chem., vol. 26, pp. 4851–55 (1961).

BERNARD HELFIN, *Primary Examiner.*

W. B. LONE, *Assistant Examiner.*